J. H. COSSMAN.
LENS CHUCK.
APPLICATION FILED NOV. 16, 1914.
1,296,050.
Patented Mar. 4, 1919.
2 SHEETS—SHEET 1.
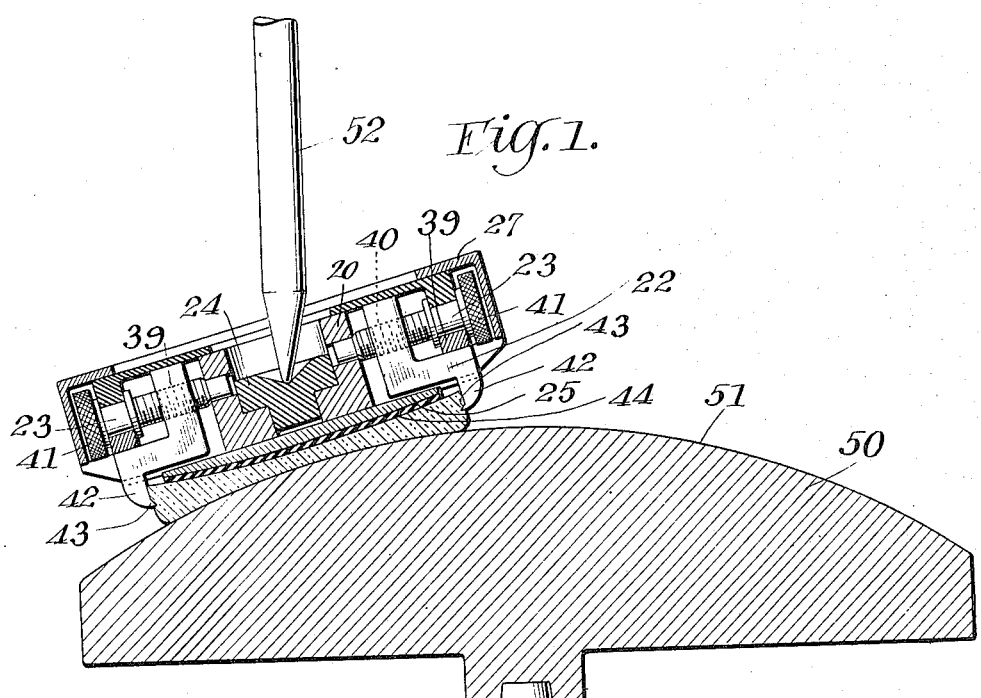
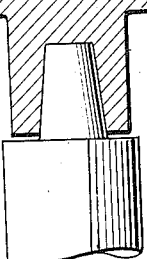
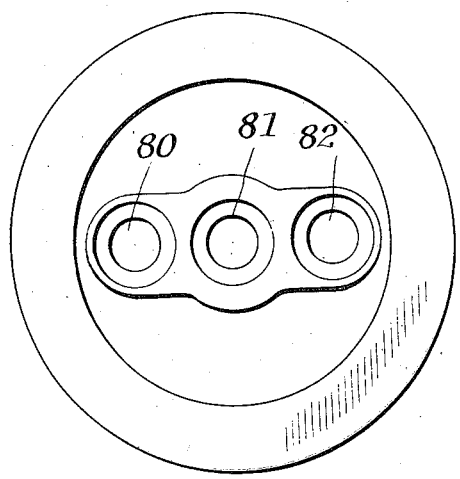
WITNESSES
INVENTOR
Joseph H. Cossman
BY
E. W. Marshall
ATTORNEY

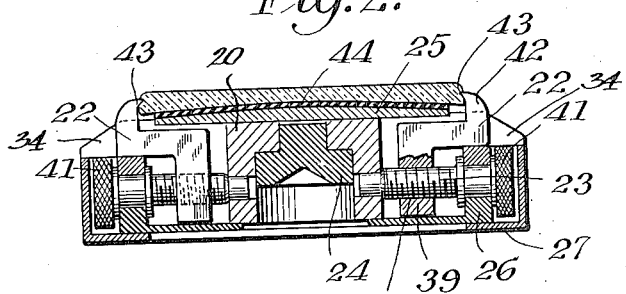
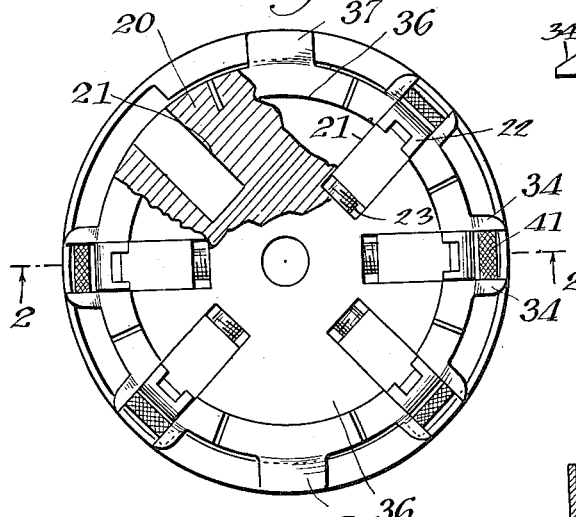
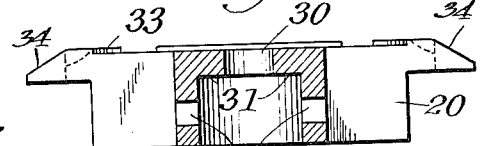
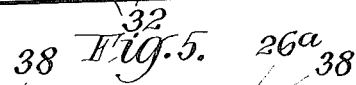
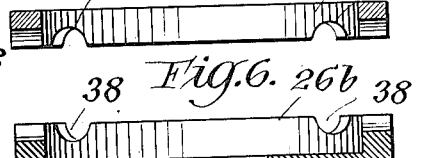
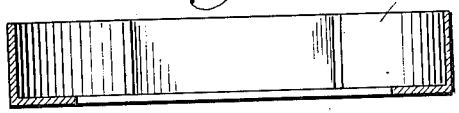
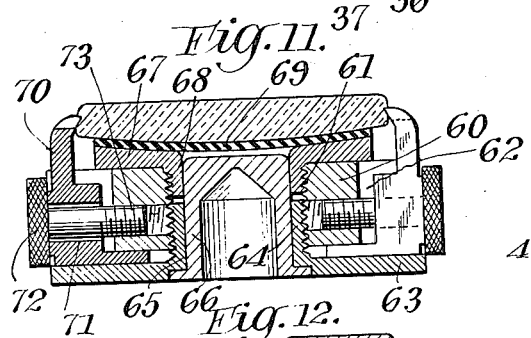
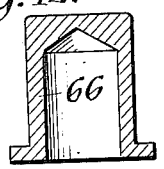
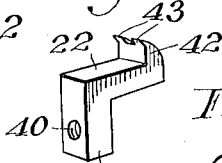
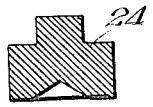
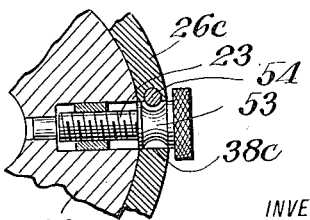
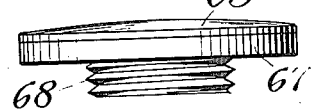

UNITED STATES PATENT OFFICE.

JOSEPH H. COSSMAN, OF PERTH AMBOY, NEW JERSEY, ASSIGNOR TO THE OPTICAL APPLIANCE CORPORATION, OF NEW YORK, N. Y., A CORPORATION OF NEW YORK.

LENS-CHUCK.

1,296,050.

Specification of Letters Patent. Patented Mar. 4, 1919.

Application filed November 16, 1914. Serial No. 872,303.

*To all whom it may concern:*

Be it known that I, JOSEPH H. COSSMAN, a citizen of the United States of America, and a resident of Perth Amboy, county of Middlesex, and State of New Jersey, have invented certain new and useful Improvements in Lens-Chucks, of which the following is a specification, reference being had to the accompanying drawings, forming a part thereof.

My invention pertains to the art of lens grinding and has special reference to means for holding the lens blank during the process of grinding optical lenses.

The rough pieces of glass from which optical lenses are ground have hitherto been supported during the grinding process, by securing them to small metal face plates by means of pitch or some other suitable cement. The cementing of the glass to the face plate necessarily required considerable time and skill, and furthermore, the losses by reason of the breakage of the glass were excessive on account of the fact that the pitch had to be applied hot to the two surfaces after both the glass and the face plate were heated. After the glass was secured to the face plate and the grinding operation well under way, the heat generated by the grinding friction was frequently sufficient to melt the pitch and loosen the lens from the face plate, necessitating the cementing process to be done over.

After the lens has been successfully ground in the aforesaid manner there is a further difficulty in separating the lens from the face plate and cleaning the pitch from the back surface which was finished first. This has been accomplished by first chilling in cold water, then striking the back of the face plate to crack the pitch. Here again the lens is liable to be broken. When successfully separated from the face plate one surface is covered with pitch and must be cleaned by carefully scraping and finally dissolving off the remainder with gasolene, or some other suitable solvent. The difficulties and expense involved in this process are evidently great.

Another difficulty has been to pitch the lens onto the face plate in a central position and parallel to the surface of the plate. Frequently the lens is set with an uneven coating of pitch or out of center, and must be repitched before the grinding operation can be commenced; otherwise a prismatic lens would result, *i. e.*, one edge would be thinner than the other.

I am aware that lens holders have hitherto been proposed, but so far as I know no lens holder or chuck which can successfully be utilized for grinding optical lenses, has been produced prior to my invention.

It has been my aim to provide a simple and readily adjustable means which, for convenience, I shall term a "lens chuck" for supporting the glass without the use of pitch or other cement, and without danger of breakage or interference with the work during the grinding process.

Another object is to provide a device of the aforesaid character that shall be particularly arranged and comprise a plurality of parts especially adapted for the peculiar conditions of service under which it is utilized.

Other objects and advantages of my invention will be set forth hereinafter, and in order that my invention may be thoroughly understood I will now proceed to describe the same in the following specification and then point out the novel features thereof in appended claims.

Referring to the drawings:

Figure 1 is a sectional elevation of a grinding tool showing the lens chuck of my invention as utilized in connection therewith.

Fig. 2 is a transverse sectional elevation of the same chuck.

Fig. 3 is a plan view of the chuck with the top plate broken away and shown in section, to bring out the position and form of the slots in which the chuck jaws are mounted.

Fig. 4 is a view corresponding to Fig. 2 of the body member of the chuck.

Figs. 5, 6, 7, 8 and 9 are detail views showing other parts of the device.

Fig. 10 is a sectional plan view showing a portion of a modified chuck in which the adjusting screws are held in position by pins instead of by a split ring as in the previous figures.

Fig. 11 is a view corresponding to Fig.

2, of another chuck structure which also embodies my invention.

Fig. 12 illustrates a center which may be substituted for the center of Fig. 11 when a convex lens is to be ground.

Fig. 13 shows a removable bed which is convex in curvature and is adapted to be utilized for the grinding of a convex lens.

Figs. 14 and 15 are sectional views showing convex and concave beds which may be substituted for the bed illustrated in Fig. 2.

Fig. 16 is a back view of a chuck which is provided with three recesses instead of one and is adapted for holding a lens blank in which a cylinder is to be ground.

Referring particularly to Figs. 1 to 9 inclusive, the structure here shown comprises a block 20 having a plurality of radial slots 21, jaws 22, adjusting screws 23 therefor, a removable center 24, a removable bed 25, a divided supporting ring 26, and a cover ring 27.

The block 20 has a central opening 30 which is enlarged at one end to form shoulders 31 relatively close to the face of the block. Radial holes 32 are provided in the inner ends of the slots 21 and constitute bearings for the inner ends of the adjusting screws 23. A shallow recess 33 is provided in the face of the block to receive the bed 25.

Projections 34 extend outwardly from the block on each side of each slot 21 for the purpose of guiding the jaws 22 as they are adjusted inwardly and outwardly. The slots 21 are arranged in two groups as clearly shown in Fig. 3 on opposite sides of the center so that comparatively wide spaces 36 are left between groups.

While I have shown six slots,—three being located on each side,—my invention is not restricted to this number and some other suitable number may be employed.

Projections 37 extend outwardly from the block at opposite points near the centers of the spaces 36. These projections, together with the projections 34, constitute a flange stop or shoulder against which the cover ring 27 is pressed. The divided ring 26 is split into two ring sections 26ª and 26ᵇ which are provided with semi-circular notches 38 which are correspondingly located and constitute a plurality of outer bearings for the adjusting screw 23 as clearly shown in Fig. 2.

Each of the jaws 22 has a projection 39 which extends downwardly to the bottom of the slot 21 into which it is placed and has a radial tapped hole 40 through which one of the adjusting screws 32 is threaded. The arrangement of parts is such that by turning the head of the adjusting screw, which is knurled, as shown at 41 and which is relatively stationary, the jaw is moved radially inward and outward in the slot 21 in which it is mounted.

The form of each jaw is clearly shown in the perspective view, Fig. 8, and attention is particularly directed to the fact that it has an upwardly extending projection 42 having sharp inclined teeth 43 which are adapted to cut into the edge surface of the glass 70 as shown in Fig. 2.

The projections 34 and 37 of the block 20 and the outer surfaces of the projections 42 are all curved so as to avoid outwardly protruding corners or projections, and the cover ring 27 is arranged to inclose the heads of the screws because the lens chuck rotates at a relatively high speed during the grinding process, and it is therefore desirable that it shall present as smooth a surface as possible.

The bed 25 is in the form of a disk having a plane bottom surface which is fitted into the recess 33 in the block 20. Its outer surface is curved to conform to one surface of the lens which it is to support and is provided with a pad 44 of rubber sheeting or other suitable material. As shown in Figs. 14 and 15, the bed may be either concave or convex and it is usual to provide a large number of these simple parts to correspond with the various curvatures desired for optical lenses.

Before proceeding to the description of the modifications shown in the other figures, the method of using the lens chuck for grinding spherical lenses, will first be discussed. Referring particularly to Fig. 1, 50 represents a grinding tool of a well known type which usually comprises a disk of cast iron having an outer surface 51 which is spherically curved, the radius of curvature being determined by the curvature of the lens to be ground. This cast iron tool having a smooth surface is rotated at a suitable speed and a mixture of emery and water is poured onto its surface while the glass which is held in the chuck, as shown in the drawing, is being pressed against it by a bar 52. This bar is pointed at one end which engages the cup-shaped center 24 of the chuck. The bar 52 constitutes a pivotal support for the chuck which is free to conform readily to the surface of the tool 50 as the glass is ground, and the grinding process consists of pressing with the bar 52 and at the same time moving the chuck backward and forward from the periphery to the center of the curved surface of the tool. By reason of the motion of the tool, the chuck, together with the lens which it supports, are rotated about the point of the bar 52 as a pivot.

The bar 52 may have a handle (not shown) and be held in the hand of the operator or it may be attached to an intermediate point in a lever which is pivotally supported at one side of the machine and extends over the tool in a well known manner.

Attention is directed to the fact that the cover ring 27 protects the adjusting screws and other internal parts of the chuck so that they are not clogged by the emery mixture which is poured over the chuck.

When the center 24 is worn out it may be removed and replaced.

The center can be arranged so that it may be conveniently replaced by other centers in order to adapt it for grinding lenses of different curvatures, but I believe it will usually be found preferable to utilize several chucks having centers located at different depths and adapted for grinding lenses having different curvatures, it being understood that it is desirable to keep the point of the bar 52 as close to the glass as possible, at all times, in order to avoid any tendency for the chuck to slip out from under the point of the bar.

Referring now to Fig. 10, instead of utilizing the divided ring 26, a single ring 26ᶜ having relatively large holes 38ᶜ may be utilized. Each of the holes 38ᶜ is then sufficiently large to receive the neck 53 of the adjusting screw 23. In this form each adjusting screw is provided with an annular groove of semi-circular cross-section, as clearly shown in Fig. 10, with which a locking pin 54 coöperates to hold the screw in position without interfering with its turning in its bearings. The ring 26ᶜ is provided with suitable holes to receive the pins 54.

Referring now to Figs. 11, 12 and 13, the structure here shown comprises a block 60 having a central tapped hole 61 and radial slots 62 corresponding to the slots 21. A disk 63 having a hollow cylindrical sleeve or projection 64 which is externally threaded, is screwed into tapped hole 61 of the block and has a central opening 65 to receive a removable center 66. This center corresponds to the center 24 except that it is intended to be removed and replaced by other centers such as that shown in Fig. 12, depending upon the curvature of the lens which is being supported for grinding. A bed 67 having a projection 68 corresponding to the projection 64, is screwed into the hole 61 of the block from the top. Its outer surface is curved to correspond to the curvature of the lens which is to be supported, and is provided with a pad 69 corresponding to the pad 44.

One of the important advantages of this structure arises from the fact that the bed may be raised or lowered until it is exactly adjusted to coöperate with the chuck jaws in supporting the lens. This adjustment is accomplished by merely turning the bed to screw its projection 68 into or out of the tapped hole 61. For example, if the outer lens surface shown in Fig. 11 is to be ground convex the bed 67 may be turned to raise the blank slightly before the jaws 70 are set and thus insure that the jaws shall not interfere with the grinding operation. The substitution of one bed for another is evidently only necessary when changes of curvature are required.

Attention is further directed to the fact that the inner surfaces of the jaws are beveled at the engaging end so that the lens blank is pressed inwardly against the bed when the jaws are set.

Jaws 70 which correspond to the jaws 22 are mounted in the slots 62, but instead of having tapped holes they are provided with radial holes 71 which have smooth bores and through which adjusting screws 72 extend loosely. These screws are threaded into tapped holes 73 in the block 60 and the jaws may be pressed against the edge surface of the blank as shown in Fig. 11 by setting the screws. The jaws however, must be pulled out after loosening the screws as they are not positively moved by the turning of the screws.

Other beds, such as that shown in Fig. 13, may be substituted for the bed 67 in order to coöperate with lens surfaces having different curvature.

When the chuck is to support a lens which is to be ground to a cylindrical curvature, it is provided with three recesses 80—81—82 as shown in Fig. 16, each of which corresponds to the single center 24 of Figs. 1 and 2. The glass is first surfaced on a spherical tool corresponding to the tool 50 except that it has a substantially plane surface, and afterward a forked bar having its fork spaced to engage the recesses 80 and 82 is employed for holding the chuck and moving it backward and forward on the cylindrically curved surface of an oscillating grinder such as is employed for grinding cylindrically curved lenses.

The arrangement of jaws as already described and as clearly shown in Fig. 3, is particularly important and essential for grinding cylindrical lenses, since the blank on two opposite edges which are placed in the space 36, is ground substantially to a knife edge. The grinding process could therefore obviously not be completed if any of the jaws of the chuck were located at these points.

For spherical work the jaws may be uniformly distributed if desired, and the chuck may then be used for cylindrical work by removing one pair of diametrically opposite jaws.

In order to determine the thickness of the glass at various points notches 83—84 are located in four quadrature points in the upper edge of the block, as shown in Figs. 3 and 4. One arm of a well known form of caliper (not shown) which is used for this purpose can readily be inserted in this slot while the other arm extends onto the top of the glass.

Attention is directed to the fact that it is possible to use pads on the bed surfaces which materially reduce the losses due to breakage, and as already set forth it is evident that the time required for securing a suitable blank in the chuck for grinding, is insignificant.

The blank may be prepared by grinding its edges on a bevel or in some other suitable manner to adapt it to be inserted in the chuck, but I consider this to be superfluous.

I am aware that chucks have been utilized for various purposes but I believe that a chuck has never been known previous to my invention which was capable of being successfully used for the purpose for which my chuck is intended. It is obvious that the structure of my device may be modified without departing from the spirit and scope of my invention, and I intend that only such limitations be imposed as are indicated in the appended claims.

What I claim is:

1. A lens holder comprising a chuck body, clamping jaws each having an inwardly inclined relatively sharp tooth projection to engage the edge surface of the lens blank, means for adjusting the clamping jaws, a removable bed having a curved surface adapted to coöperate with one surface of the lens blank, and a socket center adapted to receive a pivotal pressure rod.

2. A lens holder comprising a chuck body, clamping jaws each having an inwardly inclined relatively sharp tooth projection to engage the edge surface of the lens blank, means for adjusting the clamping jaws, a removable bed having a curved surface adapted to coöperate with one surface of the lens blank, a pad of yielding sheet material on said bed, and a socket center adapted to receive a pivotal pressure rod.

3. A lens holder comprising a chuck body, clamping members thereon, and an adjustable bed having a curvature to coöperate with one surface of the lens to be ground, said chuck body having a socket adapted to receive a pivotal pressure rod.

4. A lens holder comprising a chuck body having a plurality of radial slots, clamping jaws mounted in said slots, means for setting the jaws, a bed having a curved surface to coöperate with one surface of the lens to be ground and having a projection screwed into the body whereby the bed is adjustable, and a socket center adapted to receive a pivotal pressure rod.

5. A lens holder comprising a chuck body, clamping jaws adjustably mounted therein and each having inwardly inclined relatively sharp toothed projections to engage the edges of the lens, and a bed adjustably mounted upon the body whereby the bed may adjust a lens blank to coöperate with the jaws.

In witness whereof, I have hereunto set my hand in the presence of two subscribing witnesses, this 12th day of November, 1914.

JOSEPH H. COSSMAN.

Witnesses:
R. J. DEARBORN,
F. GRAVES.